United States Patent
Wallis (10) Patent No.: US 10,212,192 B2
(45) Date of Patent: Feb. 19, 2019

(54) SYSTEMS AND METHODS FOR INTERWORKING WITH OVER THE TOP APPLICATIONS IN COMMUNICATIONS NETWORK

(71) Applicant: MAVENIR SYSTEMS, INC., Richardson, TX (US)

(72) Inventor: Michael Brett Wallis, McKinney, TX (US)

(73) Assignee: Mavenir Systems, Inc., Richardson, TX (US)

( * ) Notice: Subject to any disclaimer, the term of this patent is extended or adjusted under 35 U.S.C. 154(b) by 90 days.

(21) Appl. No.: 15/402,608

(22) Filed: Jan. 10, 2017

(65) Prior Publication Data
US 2018/0198830 A1    Jul. 12, 2018

(51) Int. Cl.
 H04L 29/06    (2006.01)
 H04L 29/08    (2006.01)

(52) U.S. Cl.
 CPC ............ *H04L 65/105* (2013.01); *H04L 63/00* (2013.01); *H04L 65/1006* (2013.01);
(Continued)

(58) Field of Classification Search
 CPC ............... H04L 65/105; H04L 65/1023; H04L 65/1046; H04L 65/1069; H04L 67/26; H04L 67/14; H04L 67/141; H04L 67/142; H04L 67/143; H04L 67/145; H04L 67/146; H04L 67/16; H04L 67/22; H04L 65/1006; H04L 65/1073; H04L 67/10; H04L 67/34; H04W 76/19; H04W 76/25; H04W 76/28; H04W 52/02; H04W 52/0203; H04W 52/0209; H04W 52/0212; H04W 52/0216; H04W 52/0222; H04W 52/0225; H04W 52/0229; H04W 52/0235; H04W 52/0251; H04W 52/0254; H04W 52/0261; H04W 52/0264; H04W 52/0227; H04M 1/575;
(Continued)

(56) References Cited

U.S. PATENT DOCUMENTS

8,825,814 B1 *  9/2014  Efrati ..................... H04L 67/10
                                                370/352
9,148,460 B1 *  9/2015  Sun ..................... H04L 63/0815
(Continued)

*Primary Examiner* — Greg C Bengzon
(74) *Attorney, Agent, or Firm* — Ohlandt, Greeley, Ruggiero & Perle, L.L.P.

(57) ABSTRACT

Systems and methods are provided for facilitating communications with an operating system suspended OTT application on a user device. The methods include sending, from a P-CSCF or a WebRTC Gateway, to a push notification framework, a notification configured to cause the push notification framework to send a push notification to the suspended OTT application (IMS OTT application or WebRTC OTT application). The push notification may wake up the OTT application and cause a notification initiated REGISTRATION request to be sent by the OTT application. This can be initiated just before the IMS core network de-registers the OTT application based on a timer, or based on receipt of a SIP request (e.g. phone call received) when the OTT application is suspended. In addition, the push notification provides a lightweight authentication at the P-CSCF instead of a full blown authentication at the usual place S-CSCF.

18 Claims, 8 Drawing Sheets

IMS Reference Architecture for this IDF (52) U.S. Cl.
CPC ...... *H04L 65/1023* (2013.01); *H04L 65/1046* (2013.01); *H04L 65/1069* (2013.01); *H04L 65/1073* (2013.01); *H04L 67/02* (2013.01); *H04L 67/26* (2013.01)

(58) Field of Classification Search
CPC ......... H04M 1/7255; H04M 2203/551; H04M 2250/60; H04M 3/48; H04M 3/537
See application file for complete search history.

(56) References Cited

U.S. PATENT DOCUMENTS

| | | | | |
|---|---|---|---|---|
| 9,331,967 | B2 * | 5/2016 | Gangadharan | H04L 51/04 |
| 9,621,845 | B2 * | 4/2017 | Shan | H04W 4/70 |
| 9,730,156 | B1 * | 8/2017 | Chamarty | H04W 52/0209 |
| 2009/0170512 | A1 * | 7/2009 | Regnier | H04L 65/1073 |
| | | | | 455/435.1 |
| 2009/0190501 | A1 * | 7/2009 | Long | H04L 29/12188 |
| | | | | 370/254 |
| 2012/0270538 | A1 * | 10/2012 | Meylan | H04L 69/162 |
| | | | | 455/426.1 |
| 2014/0064209 | A1 * | 3/2014 | Anchan | H04W 72/0406 |
| | | | | 370/329 |
| 2014/0222894 | A1 * | 8/2014 | Gangadharan | H04L 67/02 |
| | | | | 709/203 |
| 2014/0222930 | A1 * | 8/2014 | Gangadharan | H04L 51/04 |
| | | | | 709/206 |
| 2014/0222963 | A1 * | 8/2014 | Gangadharan | H04L 65/1016 |
| | | | | 709/219 |
| 2014/0341085 | A1 * | 11/2014 | Suryavanshi | H04L 65/1016 |
| | | | | 370/260 |
| 2015/0063212 | A1 * | 3/2015 | Nirantar | H04W 76/045 |
| | | | | 370/328 |
| 2015/0331739 | A1 * | 11/2015 | Lan | H04L 43/10 |
| | | | | 714/55 |
| 2015/0351074 | A1 * | 12/2015 | Vyas | H04W 68/005 |
| | | | | 455/414.2 |
| 2015/0373056 | A1 * | 12/2015 | Bouthemy | H04L 65/1006 |
| | | | | 709/203 |
| 2016/0150393 | A1 * | 5/2016 | Ratcliffe | H04W 76/38 |
| | | | | 455/435.1 |
| 2016/0219083 | A1 * | 7/2016 | Gangadharan | H04L 65/1069 |
| 2017/0078456 | A1 * | 3/2017 | Navare | H04L 65/104 |
| 2017/0164292 | A1 * | 6/2017 | Santamaria | H04W 52/0261 |
| 2017/0201588 | A1 * | 7/2017 | Schmidt | H04L 67/141 |
| 2017/0295557 | A1 * | 10/2017 | Chamarty | H04L 67/16 |
| 2018/0034860 | A1 * | 2/2018 | Russell | H04L 65/1016 |
| 2018/0054799 | A1 * | 2/2018 | Starsinic | H04W 76/25 |
| 2018/0176876 | A1 * | 6/2018 | Alam | H04W 60/00 |

* cited by examiner

SYSTEMS AND METHODS FOR INTERWORKING WITH OVER THE TOP APPLICATIONS IN COMMUNICATIONS NETWORK

FIELD

The present disclosure generally relates to communication systems and methods, and more particularly to communication systems and methods for facilitating communications over a network with an over the top (OTT) application on a user device/equipment even when the OTT application is suspended by the user equipment operating system.

BACKGROUND

Various mobile devices, also referred to herein a User Equipment (UE), can operate in wireless communication networks that provide high-speed data and/or voice communications. The wireless communication networks can implement circuit-switched (CS) and/or packet-switched (PS) communication protocols to provide various services. For example, a user device can operate in accordance with one or more radio technologies such as: Universal Terrestrial Radio Access (UTRA), Evolved UTRA (E-UTRA), Global System for Mobile Communications (GSM), Universal Mobile Telecommunication System (UMTS), and Long Term Evolution (LTE). Descriptions and specifications for UTRA, E-UTRA, GSM, UMTS and LTE protocols are available from the Third Generation Partnership Project (3GPP), which is a partnership that united telecommunications standards development organizations and provides their members with an environment to produce reports and specifications that define 3GPP technologies.

Evolved Packet Core (EPC) technology was developed based on the 3GPP core network architecture. In EPC, the user data and the signaling data are separated into the user plane and the control plane to allow a network operator to easily adapt and scale their networks. At a high level, EPC architecture includes four basic network elements: the Serving Gateway (SGW), the Packet Data Network Gateway (PDN GW or PGW), the Mobility Management Entity (MME), and the Home Subscriber Server (HSS). The EPC can be connected to external networks, which can include an Internet Protocol Multimedia Core Network Subsystem (IMS).

An IMS is generally configured to facilitate the use of Internet Protocol (IP) for packet communications, such as telephony, facsimile, email, Internet access, Web Service, Voice over IP (VoIP), instant messaging (IM), videoconference sessions, video on demand (VoD), and the like, over wired and/or wireless communication networks. Due to bandwidth used by many IMS applications, the communications with the UE is generally over 4G, LTE radio, or wife, or the like.

Similarly, Real-Time Communication in WEB-Browsers (WebRTC) is configured to provide browsers and mobile applications with real-time communications capabilities via simple application programming interfaces and certain communication protocols. WebRTC enables applications (via a browser) such as video conferencing, file transfer, chat, voice calling, video calling, messaging, or desktop sharing. A WebRTC gateway is configured to facilitate communication between a WebRTC OTT application and an IMS core network. A user device can run a WebRTC OTT application or an IMS OTT application.

Mobile devices and other UE typically have an operating system (OS) that controls the applications run on the device/UE. Additionally, the mobile device/UE will have over the top (OTT) applications, such as a phone application or text messaging application. Some of these OTT applications are IMS applications implemented as an IMS client on the mobile device/UE. As discussed in more detail below, the more recent versions of operating systems (e.g., iOS, Android) for mobile devices and other UE, will often suspend the OTT applications after a short period of time. This suspended state prevents IMS services from being possible, and result in missed calls and messages. Thus, it is desirable for mobile phones and other UE running IMS services on OTT applications to function as expected regardless of the operating systems suspending the OTT applications. Accordingly, improved communications systems and methods are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Exemplary embodiments of the disclosure are described herein in terms of various functional components and various steps. It should be appreciated that such functional components may be realized by any number of hardware or structural components configured to perform the specified functions. Further, it should be noted that while various components may be suitably coupled or connected to other components within exemplary systems, such connections and couplings can be realized by direct connection between components, or by connection through other components and devices located there between.

Various embodiments of the disclosure provide systems and methods for maintaining some of the functionality of a client OTT application (defined herein as one of an IMS OTT application or a WebRTC OTT application) installed and running on a user device even when the operating system of the user device suspends the client OTT application. In an example embodiment, an access gateway (defined herein as one of a P-CSCF or a WebRTC gateway) is configured to send notifications through a push notification framework (e.g., GCM or APNS) to the client OTT application and/or the client OTT application is configured to receive and act upon such push notifications.

The notification, in an example embodiment, causes the OTT application to wake up. The notification, in another example embodiment, causes the OTT application to register again with the IMS core network. In another example embodiment, the access gateway (e.g., a P-CSCF or a WebRTC gateway) is configured to queue a session initiation protocol (SIP) request (e.g., INVITE), send the notification through the notification framework, and then proceed to process the SIP request (e.g., the P-CSCF can deliver the SIP request to the IMS OTT application, or the WebRTC gateway can deliver a request via the notification channel to the WebRTC OTT application) after the OTT application has woken up and registered again with the IMS core network. In yet another example embodiment, the notification provides a text message directly to the now awake OTT application, without causing the OTT application to register again.

Throughout this description, the access gateway is described in terms of a P-CSCF (a "Proxy-Call Session Control Function"), and the examples are generally illustrated in terms of a P-CSCF. Similarly, the client OTT application is generally described in terms of an IMS OTT application. Nevertheless, in each instance, the P-CSCF can be replaced herein with a WebRTC gateway, and the IMS OTT application can be replaced herein with a WebRTC OTT application with adjustment to reflect the differences between the two communication protocols. Although the WebRTC communication protocols differ from the P-CSCF, one skilled in the art, based on this disclosure, will understand how to implement the notifications described herein for this alternate embodiment. Thus, for efficiency, the disclosure related to the P-CSCF will not be repeated for the WebRTC gateway, in light of the parallel functionality and applicability of the disclosure to both embodiments.

Figure 1:
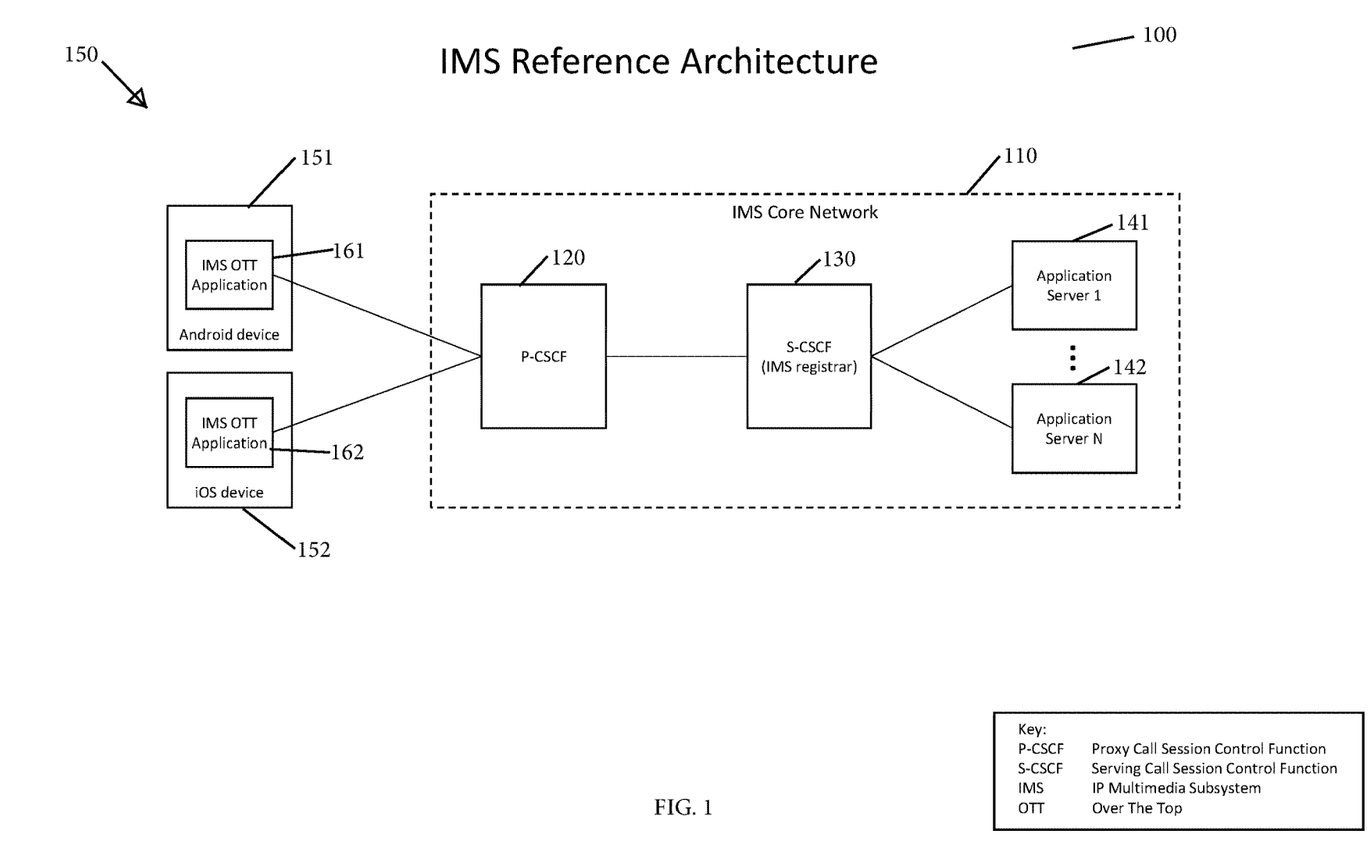
FIG. 1 illustrates a network architecture diagram for an exemplary IMS architecture according to the present disclosure.

With reference now to FIG. 1, a typical IMS reference architecture 100 is illustrated. IMS reference architecture 100 comprises, for example, an IMS core network 110. IMS core network 110, in one example embodiment, comprises a P-CSCF 120, a Serving-CSCF (S-CSCF) 130, and a first application server 141. IMS core network 110 may further comprise any suitable number of additional applications servers. Thus, in an example embodiment, IMS core network 110 further comprises an Nth application server 142.

In one example embodiment, S-CSCF 130 is connected between P-CSCF 120 and first application server 141 and between P-CSCF 120 and Nth application server 142. S-CSCF 130 is typically located in the home network, is configured to handle SIP registrations, and to decide which application server(s) the SIP message will be forwarded. S-CSCF 130 may be configured to register the user devices via P-CSCF 120 and to pass communications between P-CSCF 120 and the application servers 141, 142.

IMS core network 110 may communicate with one or more user device 150. User device(s) 150, also referred to herein as user equipment (UE), in an example embodiment, includes user devices such as a cell phone, a digital camera, a media player, a notebook, a wearable device, a tablet computer, a smart phone, a personal (e.g., laptop) computer, a streaming device, such as a game console or other media streaming device, such as Roku, Amazon Fire TV, or the like, a mobile station, a subscriber station, a mobile unit, a subscriber unit, a wireless unit, a mobile device, a wireless device, a wireless communication device, an access terminal, a mobile terminal, a handset, a user agent, or other suitable device. User devices 150 can include any suitable device with wired and/or wireless communication features.

In an example embodiment, user device 150 comprises an Android device 151, such as mobile phones made by LG, Samsung, HTC, and the like. The Android device 151 uses an Android operating system. Similarly, user device 150 may comprise, in an example embodiment, an iOS device 152, such as an iPhone, iPod Touch, iPad, iPad Mini, Apple TV, Apple watch, and/or the like. The iOS device 152 uses an iOS operating system such as versions 7.1.2, 9.3.5, 10.2, and/or the like. Android device 151 may run an IMS OTT application 161 and iOS device 152 may run an IMS OTT application 162. Example IMS OTT applications may include phone applications, text message applications, video applications, voice telephony, video telephony, video sharing, text messaging, multimedia messaging, chat, group chat, file transfer, social presence, geolocation push, audio messaging, live sketch sharing, and other media applications.

Although described herein in the context of Android and iOS operating systems and devices, it is intended that the present disclosure encompasses any similar existing or future devices and their associated operating systems, and references to Android and iOS operating systems are by way of example.

Although FIG. 1 is illustrated with P-CSCF 120, and IMS OTT applications 161 and 162, in another example embodiment, the drawing could be reproduced with a WebRTC Gateway and WebRTC OTT applications, respectively in place of these elements. A similar edit could be made in FIG. 5, where P-CSCF 520 could be replaced by a WebRTC Gateway, and IMS OT applications 561, 562 could be replaced by WebRTC OTT applications.

Figure 2:
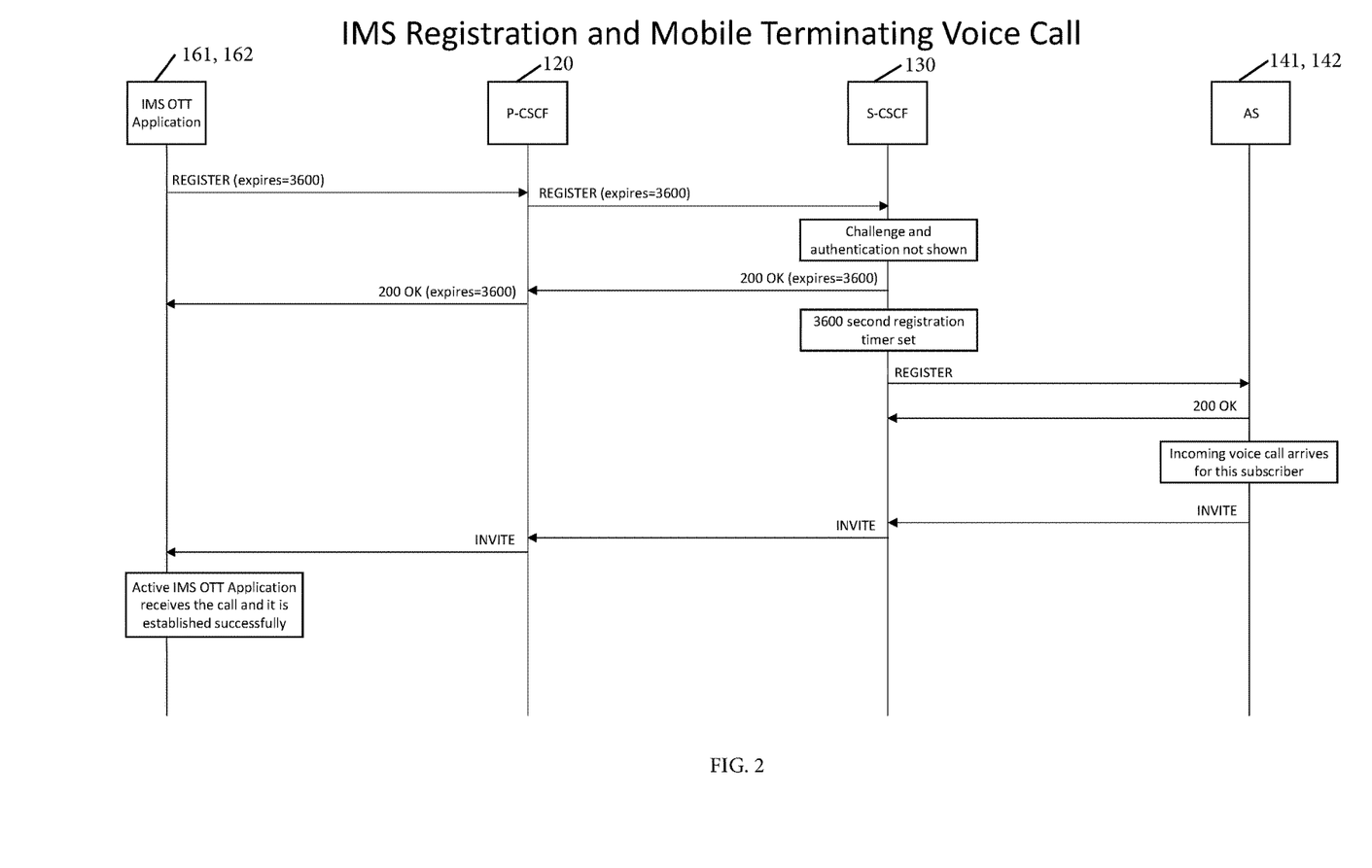
FIG. 2 illustrates an exemplary data flow diagram of an IMS registration followed by an incoming call request, according to the present disclosure.

In an example embodiment, user device 150 communicate with IMS core network 110 via P-CSCF 120. With reference now to FIG. 2, in a typical arrangement, IMS registration is implemented as the IMS OTT application (e.g., 161, 162) sends a SIP REGISTER request to P-CSCF 120. P-CSCF 120, in response to receiving the SIP REGISTER request, sends a SIP REGISTER request on to S-CSCF 130. S-CSCF 130 will typically challenge and authenticate the REGISTER request (steps not shown). Although any suitable challenge and authentication procedure can be used, the authentication of the AoR in this case can follow a typical IMS authentication procedure, as detailed in 3GPP TS 24.229, the contents of which are hereby incorporated herein by reference, to the extent such contents do not conflict with this disclosure. It is noted here, that the call flows presented in this disclosure are simplified to describe and illustrate the most relevant information for this disclosure. However, other network and IMS core network elements would likely be present in a practical implementation, and there may be intermediate steps or components in a practical implementation. For example, an I-CSCF may be located in the call flow path, and may make HSS queries, etc. These additional components and steps are understood and will not be addressed in any detail herein.

Once authenticated, S-CSCF 130, in an example embodiment, sends a 200 OK response to P-CSCF 120. P-CSCF 120 forwards the response to the client. Stated another way, P-CSCF 120 may be configured to send a P-CSCF registration confirmation signal to the user device. In an example embodiment, S-CSCF 130 sets an S-CSCF registration expiration timer. The S-CSCF registration expiration timer is set for an amount of time until the registration will expire (if the OTT application does not register again, resetting the registration expiration timer). Stated otherwise, the S-CSCF registration expiration timer is set for an amount of time that the registration will be maintained unless a new registration occurs or unless it is explicitly de-registered from the UE. The amount of time may be any suitable length of time, but in an example embodiment illustrated in FIG. 2, it is 3600 seconds. In one example embodiment, the S-CSCF timer is set to a value communicated from the IMS OTT application with the registration request.

In various example embodiments, the IMS OTT application receives notice, as part of the 200 OK message, of the length of time set on the S-CSCF timer. S-CSCF 130 is configured to also request a third party registration by sending a third party REGISTER request to the applicable application server (AS), and receiving a 200 OK confirmation from the AS (e.g., 141, 142). Registered in this manner, and assuming the IMS OTT application is not suspended, when a call, text message, etc. comes in for the user device 150, the application server can send a SIP request through S-CSCF 130, to P-CSCF 120, to user device 150. The IMS OTT application can then terminate (establish) the call, chat, text, video, etc., and, where appropriate, establish a communication path for that SIP request. At the end of the call activation procedure, P-CSCF 120 continues to handle communications, such as voice, video and messaging sessions of the user.

Somewhat recently, the operating systems (e.g., Android and iOS) of various user device have been designed to suspend OTT applications, at least in part to conserve battery power (e.g., when running in battery optimized mode). Although described herein using the word "suspend," this term is meant to include any action that prevents an IMS OTT application from being able to stay connected to the IMS core network and registered with the IMS core network, this includes the iOS term "suspend, and Google term "doze mode." This has the unintended consequence of rendering inoperable certain communication functionality of the IMS OTT application. For example, an iPhone may have a phone application with enhanced functionality downloaded on the iPhone and running as an IMS OTT application. If this application is suspended, the application may lose the network connection and/or registration with the network, and therefore the user may miss incoming phone calls or messages.

Figure 3:
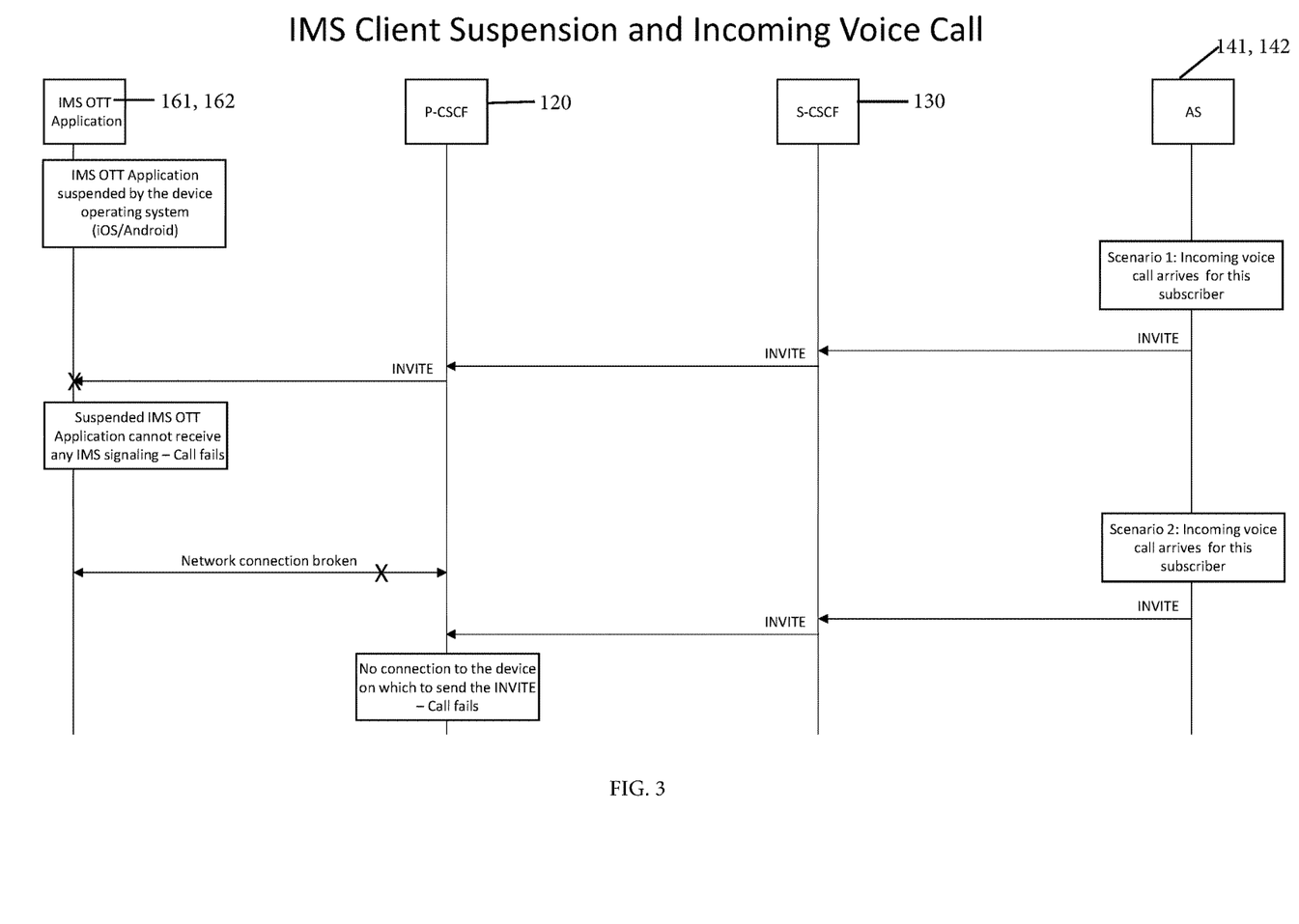
FIG. 3 illustrates an exemplary data flow diagram showing an incoming call request when the OTT application has been suspended, according to the present disclosure.

With reference to FIG. 3, this problem is illustrated more specifically. FIG. 3 comprises a diagram of operation of a typical IMS network when the IMS OTT application is suspended. In this example, IMS OTT application (e.g., 161, 162) for a particular user device 150 is suspended by the user device operating system, e.g., due to lack of use of the application for a short time. In an example embodiment, the application may be suspended within 10-15 seconds of inactivity of the application, however, the time before the operating system suspends an application can be any length of time.

In scenario 1, an incoming voice call arrives for the subscriber of this particular user device 150. The call arrives after the IMS OTT application (e.g., 161, 162) has been suspended, but before the network connection is broken, and while the IMS OTT application is still registered. In this scenario, the AS (e.g., 141, 142) sends a SIP INVITE to S-CSCF 130, which sends a SIP INVITE to P-CSCF 120, which sends a SIP INVITE to the IMS OTT application on user device 150. However, because the IMS OTT application is suspended, it cannot receive the IMS signaling, and the call fails.

In scenario 2, the IMS OTT application has been suspended long enough (e.g., 1 minute, though the time could be any length of time) that the network connection is broken. The network connection may be broken due to underlying coding in any of the IMS OTT application, the operating system, or the P-CSCF 120, based on lack of activity or other factors. In scenario 2, when the incoming voice call arrives, unlike in scenario 1, P-CSCF 120 receives but does not send the SIP INVITE on to the IMS OTT application, so the call fails.

Figure 4:
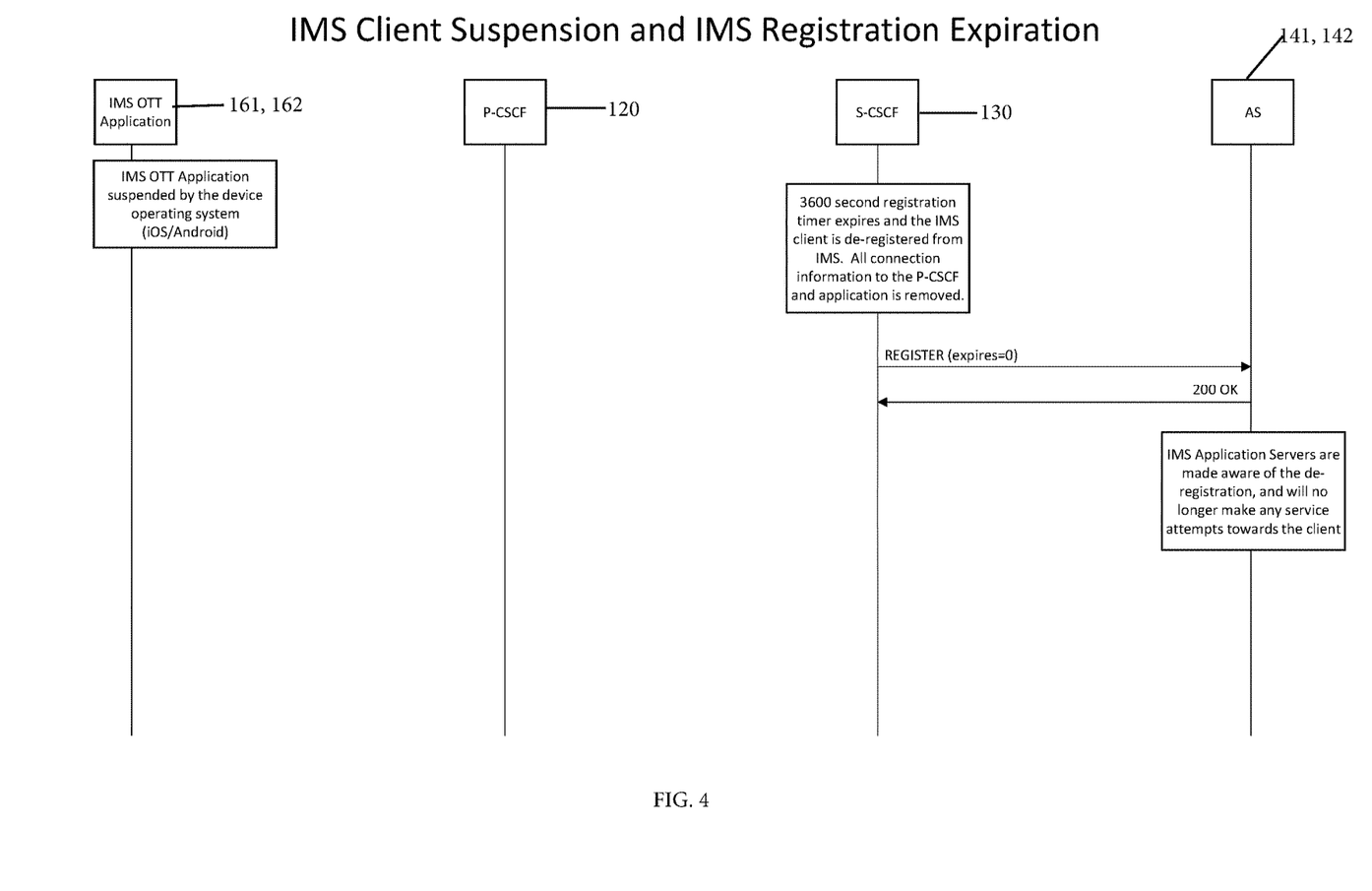
FIG. 4 illustrates an exemplary data flow diagram showing the result of an extended period of suspension, according to the present disclosure.

With reference to FIG. 4, a third scenario is illustrated. FIG. 4 also comprises a diagram of operation of a typical IMS network when the IIMS OTT application is suspended. In this example, the IMS OTT application (e.g., 161, 162) for a particular user device 150 has been suspended by the user device operating system for long enough that the S-CSCF registration with the AS has expired. For example, here, the S-CSCF registration expiration timer counted down 3600 seconds until it reached zero, or otherwise waited for an hour, and then de-registered the IMS client. For example, S-CSCF 130 may de-register the IMS client by sending a SIP REGISTER (expires=0) request to the AS (e.g. 141, 142). In this scenario, all connection information to P-CSCF 120 and to the AS is removed. In this event, if a call comes in for the particular user device, the AS will not make any service attempts toward the OTT client on that user device, and the call will fail.

Attempts to address these problems have been unsatisfactory. One less favorable option for addressing these problems is to send frequent 'keep-alive' messages to/from the application. For example, the P-CSCF 120 may periodically send a carriage-return line-feed (CRLF) signal to the IMS client to keep the application from being suspended. This wastes battery power, consumes network resources, and is now a deprecated solution on the latest operating system versions.

Another less favorable option for addressing these problems is to install the IMS OTT application in non-battery optimized mode. But this solution results in poor battery life on the device and is no longer allowed by the operating systems.

In an example embodiment, the OTT application may be awakened via a notification sent via the device-specific push notification framework. The device-specific push notification framework for Android devices, for example, is Google Cloud Messaging (GCM). The device-specific push notification framework for iOS devices is Apple Push Notification Service (APNS). In an example embodiment, the application servers can be configured to blindly send push notifications via the GCM/APNS push notification framework. But this would be undesirable for a couple reasons. First, it would mean that for a comprehensive solution, each AS would need to be configured to send such push notifications to the push notification framework. Second, the process of would take an undesirable amount of time to do a complete IMS registration and authorization. Under many circumstances, the incoming phone call is waiting while this process is being completed. So it is desirable that a faster solution be developed.

Thus, in an example embodiment, notifications are sent to the push notification framework from the access gateway (comprising one of P-CSCF or WebRTC Gateway). This has the advantage of only sending the notification from a single point, or single functional element (P-CSCF or WebRTC Gateway). It also has the advantage that the access gateway (comprising one of P-CSCF or WebRTC Gateway) is aware of the registration and connection status of the IMS OTT application, and can send the push notifications only when needed, and/or useful. Stated another way, the access gateway (comprising one of P-CSCF or WebRTC Gateway) may be configured to not send push notifications when the IMS OTT application will not support them or when it is still connected to the network. Moreover, the access gateway (comprising one of P-CSCF or WebRTC Gateway) may be configured to send the notification before the network connection is broken, or at least before the OTT client is de-registered. In this embodiment, delays in communication and failed communications are avoided by performing a notification triggered registration before deregistration occurs. In another example embodiment, the notification triggered registration occurs after deregistration occurs. In another example embodiment, a notification triggered registration can occur using a light-weight authentication mechanism involving sending the notification from the access gateway, thus reducing the delay time in communicating with a suspended OTT client.

Figure 5:
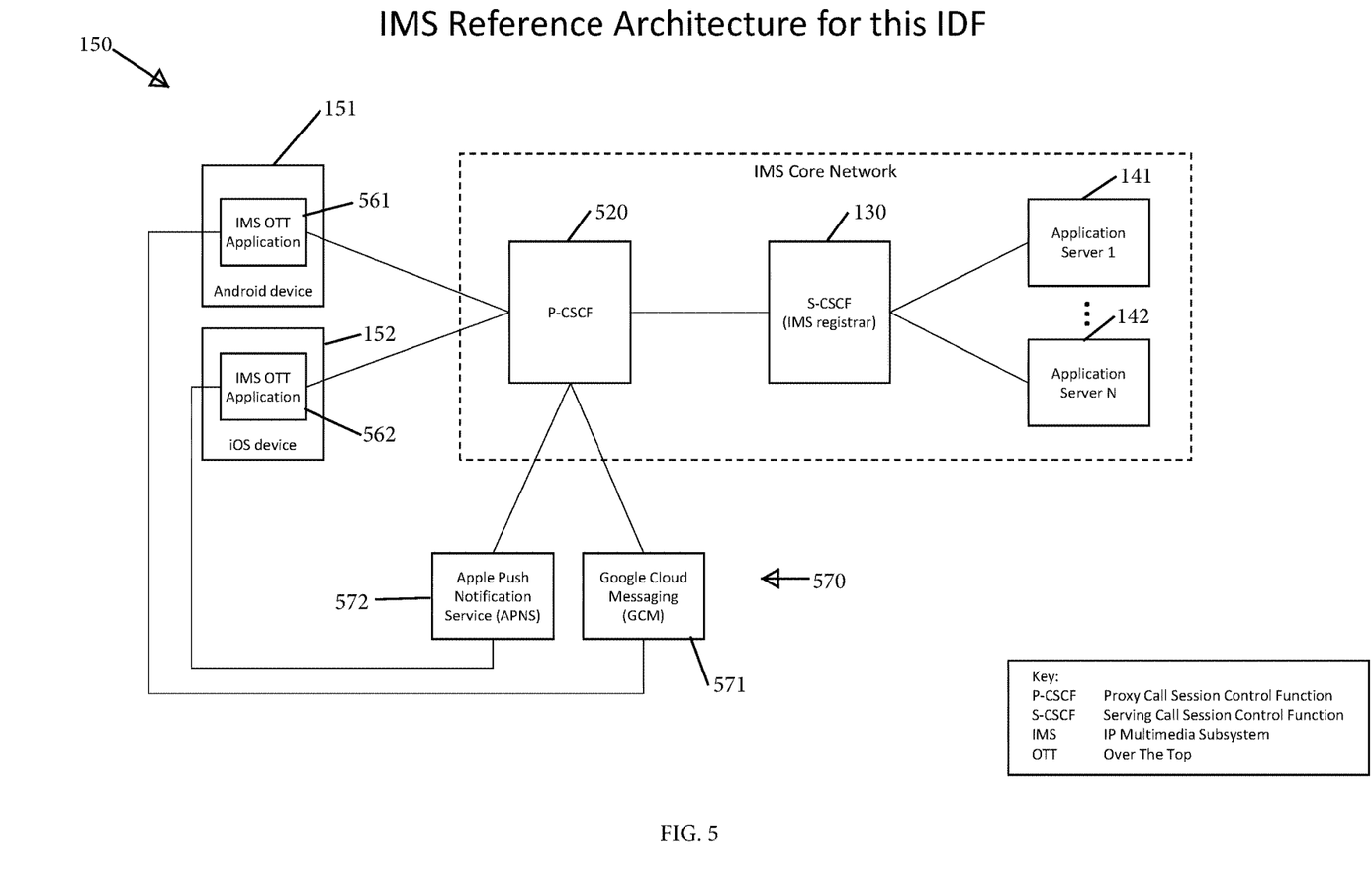
FIG. 5 illustrates a network architecture diagram including exemplary push notification type applications, according to the present disclosure.

This solution is described in further detail with reference first to FIG. 5, which illustrates in block diagram format the signal flow associated with an example embodiment where P-CSCF 520 is configured to send notifications to a push notification framework 570. In an example embodiment, push notification framework 570 comprises the Apple Push Notification Service (APNS) 572. In another example embodiment, push notification framework 570 comprises the Google Cloud Messaging (GCM) 571. Moreover, push notification framework 570 may comprise any suitable system configured to receive a notification signal and send a push notification to an operating system of a specific device such that the operating system will wake up the identified IMS OTT application and deliver the notification.

In an example embodiment, APNS 572 is configured to send a push notification to IMS OTT application 562 on iOS device 152. In another example embodiment, GCM 571 is configured to send a push notification to IMS OTT application 561 on Android device 152. The push notification is configured to wake up the IMS OTT application 561, 562. In another example embodiment, the push notification is configured to cause the IMS OTT application to send a REGISTER request to P-CSCF 520 to cause a notification triggered registration with S-CSCF 130.

In accordance with another example embodiment, an intermediate node can be located between P-CSCF 520 and the notification framework 570. For example, Amazon currently provides a service such that P-CSCF 520 can send a notification in a single format that gets translated by the intermediate node and conveyed to APNS or GCM as appropriate. Thus, although describe herein in terms of communicating (interworking) directly with the device-specific push notification framework, and sending notifications formatted for the appropriate APNS or GCM, it is to be understood that other systems, such as this intermediate node example, of sending a push notification originated by P-CSCF 520 may be utilized. For example, the notifications may be sent via a separate party notification server which sits in front of these OS-specific notification frameworks while providing a single interface to P-CSCF to wake up the IMS OTT applications so that they remain IMS registered and a particular request from the network can be received. Moreover, throughout this application, even though the nodes may be discussed as in communication with each other or sending information from one to another, any number of intermediate nodes may exist between the nodes if the end function is similar.

Figure 6:
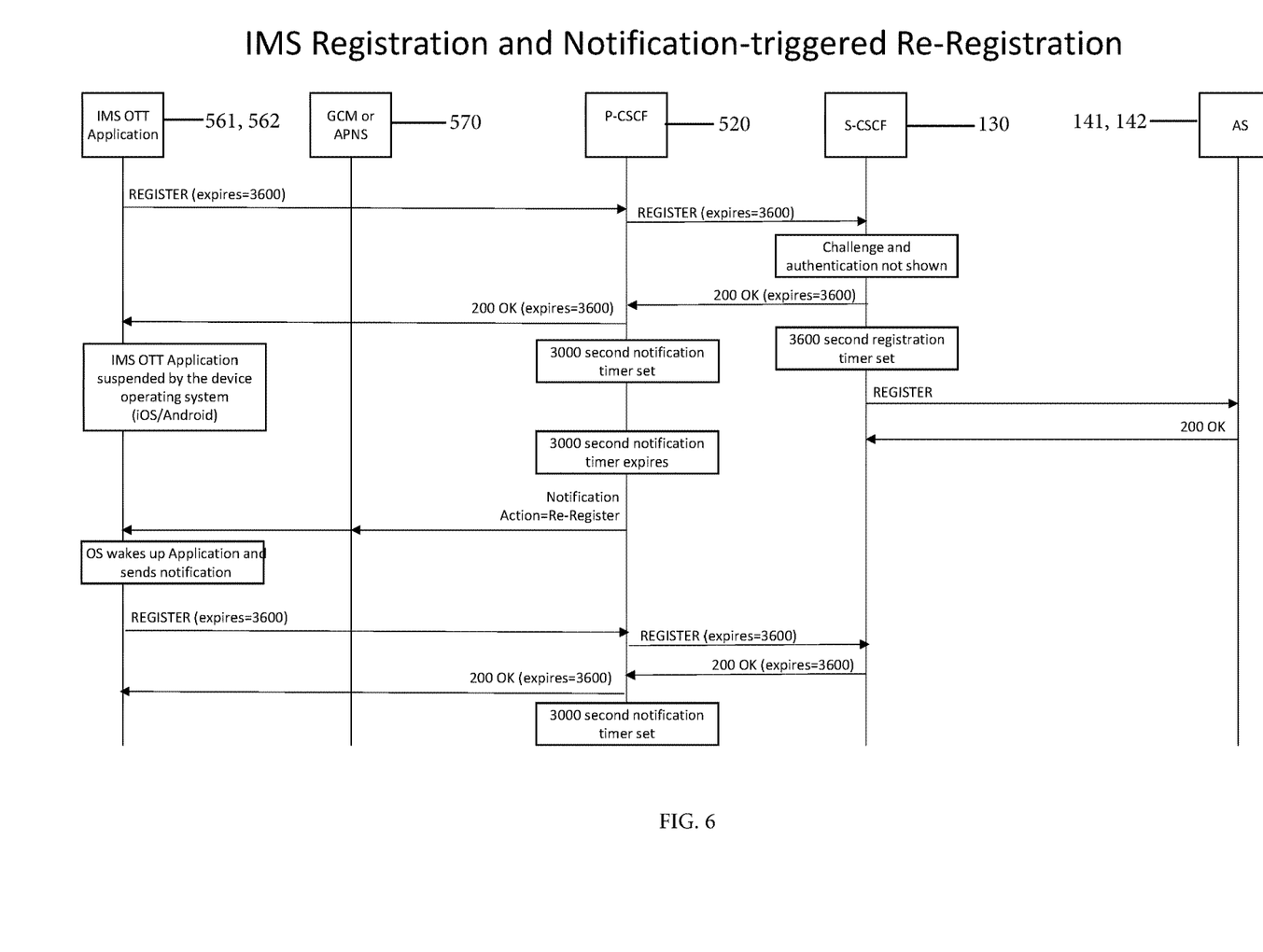
FIG. 6 illustrates an exemplary data flow diagram showing the sending of notifications to the IMS OTT application to keep the IMS application registered in the IMS, according to the present disclosure.

FIG. 6 illustrates a flow diagram of operation of an example embodiment of an IMS network when the IMS OTT application is suspended. IMS registration is implemented as the IMS OTT application (e.g., 561, 562) sends a SIP REGISTER request to P-CSCF 520. A network contact point (e.g., a P-CSCF) 520 is a session-initiation-protocol (SIP) first point of contact with an IMS core network. Moreover, a network may have multiple P-CSCF nodes for redundancy, and each P-CSCF 520 may be a distributed system or a single server.

P-CSCF 520, in response to receiving the SIP REGISTER request, sends a SIP REGISTER request on to S-CSCF 130. S-CSCF 130 will typically challenge and authenticate the REGISTER request (steps not shown). Although any suitable challenge and authentication procedure can be used, the authentication of the AoR in this case can follow a typical IMS authentication procedure, as detailed in 3GPP TS 24.229, the contents of which are hereby incorporated herein by reference, to the extent such contents do not conflict with this disclosure.

Once authenticated, S-CSCF 130, in an example embodiment, sends a 200 OK response to P-CSCF 520. P-CSCF 520 forwards the response to the client. In an example embodiment, S-CSCF 130 sets an S-CSCF registration expiration timer. The S-CSCF registration expiration timer is set for an amount of time until the registration will expire (if the OTT application does not register again, resetting the registration expiration timer). Stated otherwise, the S-CSCF registration expiration timer is set for an amount of time that the registration will be maintained unless a new registration occurs or unless it is explicitly de-registered from the UE. The amount of time may be any suitable length of time, but in an example embodiment illustrated in FIG. 6, it is 3600 seconds. In one example embodiment, the S-CSCF timer is set to a value communicated from the IMS OTT application with the registration request. In various example embodiments, the IMS OTT application receives notice, as part of the 200 OK message, of the length of time set on the S-CSCF timer.

S-CSCF 130 is configured to also initiate a third party registration by sending a third party REGISTER request to the applicable AS, and receiving a 200 OK confirmation from the AS (e.g., 141, 142). Registered in this manner, and assuming the IMS OTT application is not suspended, when a call, text message, etc. comes in for the user device 150, the application server can send a SIP request through S-CSCF 130, to P-CSCF 520, to user device 150. The IMS OTT application can then terminate (establish) the call, chat, text, video, etc., and, where appropriate, establish a communication path for that SIP request. At the end of the call activation procedure, P-CSCF 520 continues to handle communications, such as voice, video and messaging sessions of the user.

In an example embodiment, a WebRTC gateway (WRG) may comprise a P-CSCF 520. The WebRTC gateway may appear to the rest of the IMS core network as a P-CSCF. Thus, although described throughout this disclosure as a P-CSCF, the disclosure is equally applicable to a WebRTC gateway talking to an OTT WebRTC client. The WRG may be configured to sit at the access edge of an IMS network. In an example embodiment, then, the notifications described herein sent from P-CSCF 520 are sent from an access node on the edge of an IMS core network, and this provides a single entry point to the IMS core network. This is in contrast to solutions that involve each AS. Stated another way, the system can be configured to comprise a plurality of application servers communicating with a plurality of IMS OTT applications, wherein the notification triggering the push notification, from each of the plurality of application servers to any of the plurality of IMS OTT applications, originates only from a single functional element, e.g., the access gateway.

Upon the OTT application's successful registration with the IMS network, in an example embodiment, P-CSCF 520 is configured to set a notification triggered registration timer. P-CSCF 520 has already received the registration expiration timer value from a S-CSCF, and in an example embodiment, P-CSCF 520 is configured to set the notification triggered registration timer some amount shorter in duration than the registration expiration timer value (the IMS registration interval). At (or potentially before) the expiration of the notification triggered registration timer, and certainly before the expiration of the registration expiration timer, if the IMS OTT application is no longer connected to the network, P-CSCF 520 can send a notification (execute the sending of the notification) via the device OS's notification framework to trigger the IMS OTT application to wake up and perform a notification triggered registration with the IMS network. This keeps the OTT application's IMS registration active so that subsequent requests can be delivered to it. The notification can be addressed to the subscriber's identity (e.g. IMS public user identity or MSISDN) or a device/client-specific identity (e.g. an IMEI or UUID assigned to the specific device/client). Moreover any suitable way of addressing the notification can be used.

In an example embodiment, P-CSCF 520 is configured to keep track of the OTT application's connectivity to the network, e.g. via transmission control protocol (TCP) connection, transport layer security (TLS) session, IPsec association or similar means. The application's connectivity state can then be used to determine whether or not to send a notification as described herein.

Figure 7:
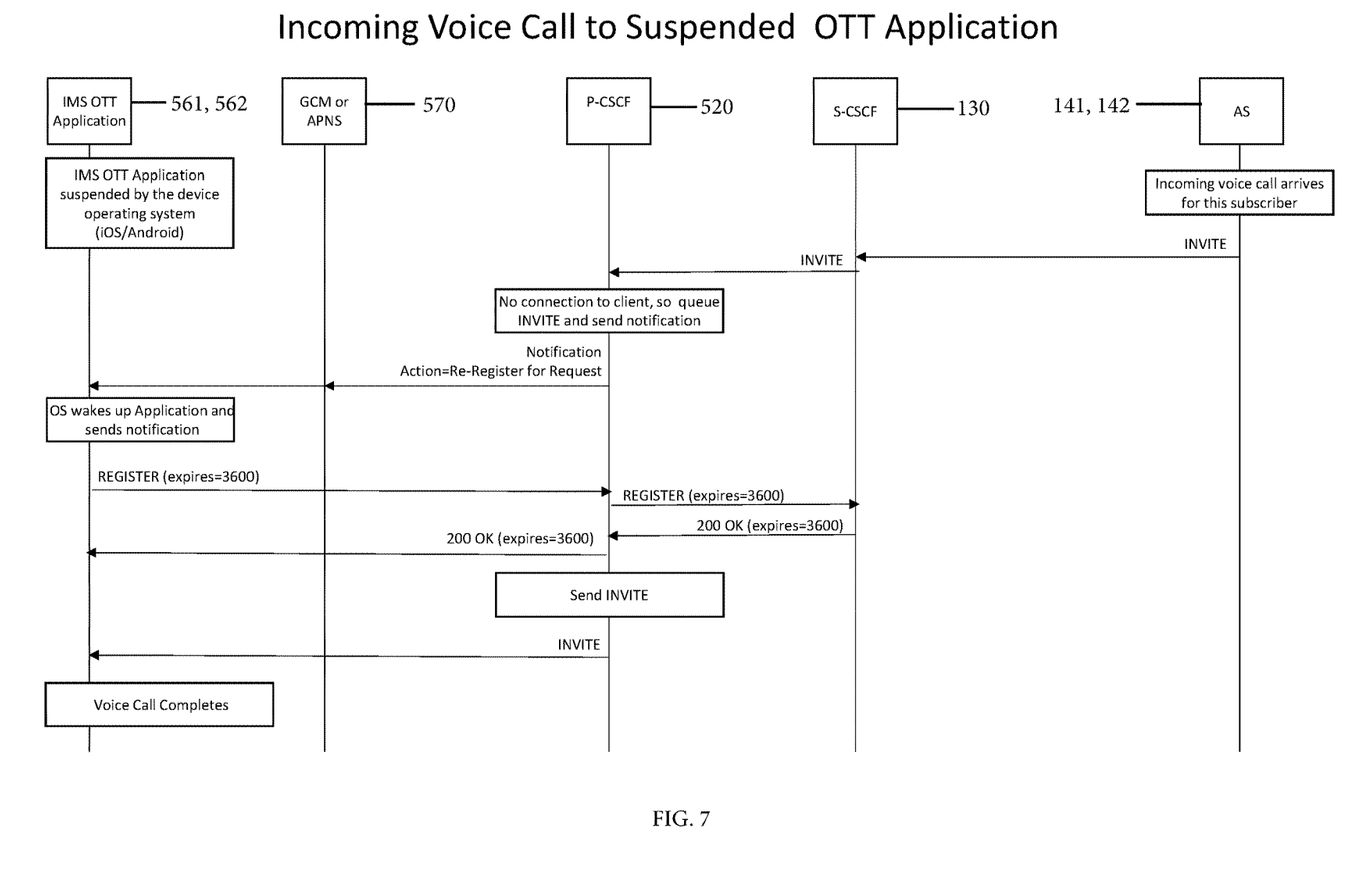
FIG. 7 illustrates an exemplary data flow diagram showing the sending of a notification to the IMS OTT application to complete a voice call, according to the present disclosure.

FIG. 7 illustrates another diagram of operation of an example embodiment of an IMS network when a voice call comes in to the suspended IMS OTT application. In this example embodiment, an incoming voice call arrives at the AS (e.g., 141, 142) and a SIP INVITE is sent from the AS to S-CSCF 130, which passes the INVITE on to P-CSCF 520. As mentioned above, P-CSCF 520 knows the connection status of the client to IMS core network 110. If there is no connection to the IMS client (i.e., when the IMS OTT application does not have an active connection to an IMS core network), P-CSCF 520 is configured to queue the SIP request (and SIP INVITE in this case) pending confirmation that the OTT application is awake and ready to receive the SIP request. P-CSCF 520 can then send a notification via the device OS's notification framework to trigger the IMS OTT application to wake up and register with the IMS network. Upon receipt of this registration of the IMS OTT application (with the confirmation provided back from S-CSCF and provided on to P-CSCF), the P-CSCF can de-queue the pending request and send it to the IMS OTT application (e.g., once network connection has been re-established and there has been a successful IMS registration). In an example embodiment, this avoids potential message overwrite scenarios within the push notification frameworks, as some allow only a single notification per device to be stored.

In an example embodiment, as used throughout this application, the SIP requests may comprise a number of different types of requests. For example, the SIP requests can include one of the following SIP request types: a MESSAGE, an INVITE (voice/video/chat session), a NOTIFY, or an OPTIONS, or other SIP requests now known or defined in the future. In an example embodiment, the P-CSCF is configured to selectively queue, based on the SIP request type, the SIP requests. In an example embodiment, the queuing is assigned a configurable validity period.

Moreover, the SIP request can comprise any suitable SIP request. In an example embodiment, the P-CSCF 520 is configured to allow the operator to selectively identify types of SIP requests that warrant queueing and a notification. In this manner, the operator has discretion to program what SIP requests will trigger waking up the suspended application. For example, an operator may program P-CSCF 520 such that a voice call will be queued and wake-up the suspended application, but a chat invite or a text message would not.

In accordance with exemplary embodiments of the disclosure, the system and methods are configured such that the solution to the suspended IMS OTT applications is service agnostic. For example, stated another way, any IMS application which delivers a service to an OTT application on a mobile device can use this invention, as the P-CSCF based solution is service agnostic. P-CSCF 520 and the IMS OTT application are configured as described herein to facilitate communication with a suspended IMS OTT application for one or more of the following services: voice, video, text messaging, address book, etc. This solution at a single node (speaking functionally of the P-CSCF node, and not physically) works despite the different services being served up by separate application servers. The P-CSCF 520 is configured to provide a single entry point for addressing the suspended application and sending the notifications as described herein. Stated another way, P-CSCF 520 is configured such that the notification triggering the push notification originates (is initiated) only from a single functional element, e.g., the access gateway. Moreover, the P-CSCF 520 is the only node that really knows the status of the connection with the IMS client.

Performing this interworking at the IMS network's access edge is a superior solution to other application server based solutions, as it provides a single point of interworking to the notification frameworks for all IMS services and also makes it possible to maintain an active IMS registration. Also, in an example embodiment, performing this interworking at the IMS network's access edge makes it possible to maintain an active IMS registration without having to perform a full authentication each time.

In an example embodiment, and with continued reference to FIG. 7, a notification sent by P-CSCF 520 for queued IMS requests can be assigned a configurable validity period, after which the IMS OTT application does not need to act upon it. This may be useful for scenarios where the IMS OTT application is offline for a long period of time, e.g. during a flight.

Figure 8:
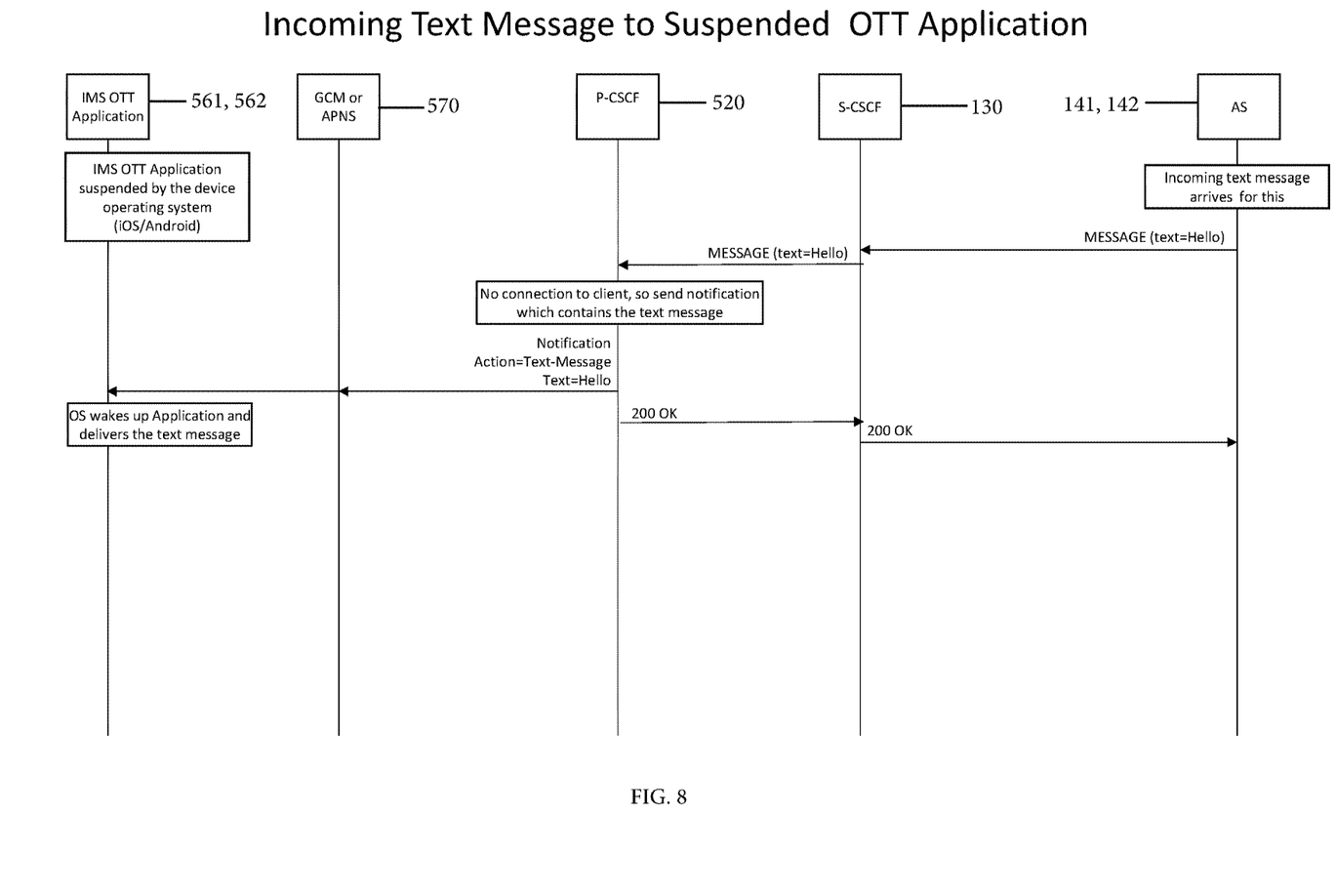
FIG. 8 illustrates an exemplary data flow diagram showing the sending of an incoming text message with the notification to the IMS OTT application, according to the present disclosure.

FIG. 8 illustrates another diagram of operation of an example embodiment where an incoming text message arrives for the IMS OTT application, which is currently suspended by the device operating system. In this example embodiment, the AS sends the SIP request (MESSAGE (text=Hello)) to S-CSCF 130, which sends the SIP request on to P-CSCF 520. P-CSCF 520 recognizes that the network connection to the IMS client is broken, and that this is a MESSAGE type SIP request that does not need to terminate a call or get another response from the IMS OTT application. Therefore, in an example embodiment, P-CSCF 520 sends a notification to the notification framework 570, including (embedding) the text message itself. For example, P-CSCF 520 may send Notification, Action=Text-Message, Text=Hello. In an example embodiment, GCM or APNS may then send a push notification containing the text of the text message to the IMS OTT application, wake up the application and deliver the text message. Stated more broadly, in an example embodiment, P-CSCF 520 is configured to embed information from the SIP request within the notification. Thus, in an example embodiment, P-CSCF 520 is configured to pass additional information to the OTT application, within the notification itself. The additional information may include, for example, a text message, an identification of the calling party, the type of queues request/service waiting, etc. Thus, in an example embodiment, when the SIP request contains information that does not require a response (such as a text message), the P-CSCF may be configured to include that information (e.g., the text message itself) in the notification, and the push notification may be configured to awaken the OTT application and deliver the information without sending a registration request.

In an example embodiment, P-CSCF 520 can support detecting an OTT application's support for the device OS's push notification framework. For example, P-CSCF 520 can detect an OTT application's support for an OS's notification framework via special indicator in signaling. For example, this could be a SIP header, SIP feature tag or other header parameter, HTTP header (for WebRTC Gateway), etc. If the IMS OTT application does not support push notification, then P-CSCF 520 is configured to not attempt to send the notification and to resolve the attempted communication more quickly. In another example embodiment, the OTT application identifies its support for push notifications by sending a new "+push-not" feature tag in the Contact header of the REGISTER request. In an example embodiment, P-CSCF 520 can be configured to store this support indicator. So when an incoming SIP request comes into the P-CSCF, the P-CSCF checks for the presence of this feature tag to determine whether to invoke the logic described in this application. Moreover, the methods and systems disclosed herein can include other mechanism(s) of identifying the IMS OTT application push notification capability.

For OTT applications that do support the devices OS push notification framework, P-CSCF 520 can use the device OS's push notification framework to keep the OTT application registered in IMS, and to wake up the OTT application when it has a request to send to the OTT application, e.g. a SIP initial INVITE request for an incoming call. P-CSCF 520 can support queueing IMS requests pending confirmation that the OTT application has been awakened, and can also support configuration(s) which control(s) what requests trigger a notification be sent.

Thus, in an example embodiment, the system and methods disclosed herein can avoid sending notifications to applications that do not support push notification. This technique can reduce the usage of network resources, and quicker determination on what to do with incoming SIP requests. For example, if the particular incoming SIP request goes to an IMS OTT application that is not able to receive push notifications, and the network connection is broken, the P-SCSF can reply back or otherwise end the SIP request, so that the caller is not holding for very long.

During a normal IMS registration, the registration is challenged by the IMS core for authentication purposes. This is time consuming, as it involves (1) rejecting the first REGISTER request from the OTT client, (2) retrieving authentication credentials from the HSS, and providing the authentication credentials to the client. The client then sends another REGISTER request with an authentication response based on the earlier provided authentication credentials. If the response is correct, the authentication is successful and the registration is allowed. Under circumstances where the client OTT has already been authenticated, it is desirable to avoid undergoing this full process to perform notification-triggered registration(s).

In an example embodiment, the notification, sent to trigger registration of the OTT application, can contain a token generated by one of P-CSCF 520 or WebRTC Gateway. This token can serve as a basis for authentication when the OTT client registers. In an example embodiment, the token serves as a Digest password by the client and P-CSCF/WRG for computing a MD5 digest, as described in more detail below. In this manner, the token can serve as a lightweight authentication mechanism, avoiding the need for full IMS authentication of the client and speeding up delivery of the SIP request to the OTT application.

Thus, in an example embodiment, the access gateway (P-CSCF or WebRTC Gateway) and the OTT client (IMS OTT application or WebRTC OTT application) are configured to perform Digest authentication (which is defined in IETF RFC 2617) of notification-triggered REGISTER requests. This can be done, in one example embodiment, as follows:

1) In an example embodiment, the P-CSCF/WRG generates a token and nonce, and passes the token and nonce to the OTT application, via the notification.

2) This token and nonce are received by the OTT application.

3) The OTT application calculates a MD5 digest as defined by specifications (IETF RFC 2617, the contents of which are incorporated herein by reference in their entirety to the extent it is not contrary to the disclosure herein) using the token as the Digest password, and sends a Digest response in the REGISTER request.

4) Upon receiving the REGISTER request, the P-CSCF/WRG uses the locally stored token (Digest password) and nonce to compute its own Digest response, and compares this with the Digest response received in the REGISTER request. If they match, then P-CSCF/WRG is configured to treat the authentication as a success. This is very different from the prior art because, normally, the P-CSCF plays no role in authenticating a request, which typically done by the S-CSCF. However, here, the role of authenticating a request can be limited to the P-CSCF.

5) In the REGISTER request that the P-CSCF sends to the S-CSCF, it includes an "auth-done" indication to tell the S-CSCF that authentication has already been performed. The "auth-done" indication causes no further authentication of this REGISTER request to be performed, i.e. there is no authentication challenge performed. This speeds up the push-triggered registration process, which is important because often there are queued requests waiting to be acted upon/delivered.

In summary, passing a token and nonce with the notification provides a way for the P-CSCF/WRG to perform a lightweight authentication for these notification-triggered REGISTER requests. Otherwise, authentication would have to be performed by the S-CSCF or disabled altogether, which involves more messaging and takes more time. The lightweight authentication, in an example embodiment, means that S-CSCF and/or HSS are not involved in the authentication.

From the perspective of the OTT application 561, 562, in an example embodiment, OTT application 561, 562 are configured to receive a push notification from a push notification framework that was triggered by a notification from P-CSCF/WRG. In one example embodiment, the push notification causes the OTT application to wake up. In another example embodiment, the push notification causes the OTT application to wake up and send a REGISTER request. In yet another example embodiment, the push notification causes the OTT application to wake up, check to see if the registration is still valid, and if it is not still valid, to send a REGISTER request to the IMS core network. In another example embodiment, the push notification includes a token and a nonce. The token may for example be a randomly generated security token. OTT application 561, 562, in an example embodiment, is configured to generate a Digest response based on the security token and to include the Digest response with the REGISTER request sent to the IMS core network. Thus, the OTT application 561, 562 is configured to facilitate lightweight authentication at P-CSCF 520 and avoids the added steps of doing the full IMS registration process.

Examples of the disclosure are discussed in connection with providing various functions in connection with an IMS network using SIP. However, unless otherwise noted, the disclosure is not limited to use with such networks and/or protocols, and to the extent compatible, can be used in connection with other communication networks, network architectures, and/or protocols.

In accordance with various embodiments of the disclosure, the user devices include a client. As used herein, the client can refer, for example, to a downloadable OTT application, a native phone application, a soft phone or a browser-based client. The client can be configured to perform any function defined in specifications for an IMS client/UE or a WebRTC Client, including, for example, registering with the IMS core network, and sending/receiving services.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

The invention claimed is:

1. A method for facilitating communications with an operating system suspended over-the-top (OTT) application on a user device, the method comprising:
    sending, from an access gateway to a push notification framework, a notification configured to cause the push notification framework to send a push notification to the suspended OTT application, wherein the access gateway is one of a Proxy-Call Session Control Function (P-CSCF) or a Real Time Communication in Web-browsers (WebRTC) Gateway, and wherein the access gateway is configured to (i) determine, based on one of session initiation protocol (SIP) header information or hypertext transfer protocol (HTTP) header information, whether the suspended OTT application supports the push notification framework, and (ii) send the notification to the push notification framework to cause the sending of the push notification, only if the suspended OTT application supports the push notification framework.

2. The method of claim 1, wherein the access gateway is the P-CSCF and the OTT application is an Internet Protocol Multimedia Core Network Subsystem (IMS) OTT application.

3. The method of claim 1, wherein the access gateway is the WebRTC Gateway and the OTT application is a WebRTC OTT application.

4. The method of claim 1, further comprising receiving a registration expiration timer value from a Serving Call Session Control Function (S-CSCF), and setting a notification triggered registration timer shorter in duration than the registration expiration timer value, wherein said sending occurs upon expiration of the notification triggered registration timer.

5. The method of claim 1, wherein:
    the sending of the notification to the push notification framework occurs upon receipt of a SIP request when a network connection is broken, and
    in the case of receiving the SIP request for a text message, the access gateway sends the text message as a part of the notification to the push notification framework.

6. The method of claim 2, further comprising:
    receiving, at the P-CSCF, from the user device, the IMS OTT application REGISTER request;
    sending, from the P-CSCF, to an S-CSCF, a third party REGISTER request;
    receiving, at the P-CSCF, from the S-CSCF, a third party registration confirmation signal including a registration expiration timer value;
    sending, from the P-CSCF, to the user device, a P-CSCF registration confirmation signal;
    setting a notification triggered registration timer for a length of time less than the registration expiration timer value; and
    wherein the sending of the notification is executed upon expiration of the notification triggered registration timer.

7. The method of claim 2, wherein the notification causes the push notification framework to send the push notification to the user device causing the IMS OTT application to wake up and send a notification triggered REGISTER request to the P-CSCF to register with S-CSCF in order to keep the IMS OTT application registered even when the IMS OTT application is suspended by the operating system.

8. The method of claim 3, wherein the notification causes the push notification framework to send the push notification to the user device causing the WebRTC OTT application to wake up and send a notification triggered REGISTER request to the WebRTC Gateway to register with S-CSCF in order to keep an OTT application registered in IMS even when the WebRTC OTT application is suspended by the operating system.

9. The method of claim 1, wherein the push notification framework comprises at least one of Google Cloud Messaging and Apple Push Notification Service; and wherein the operating system is Android or iOS, respectively.

10. The method of claim 2, comprising:
receiving, at the P-CSCF, from a S-CSCF, a session initiation protocol (SIP) request;
queuing the SIP request when the IMS OTT application does not have an active connection to an IMS core network;
wherein the sending of the notification is executed after the queuing of the SIP request; and
sending, from the P-CSCF to the user device, the SIP request upon: (1) re-establishment of the active connection to the network, and (2) a successful IMS registration;
wherein the notification causes the push notification framework to send the push notification to the user device causing the IMS OTT application to wake up and send a notification triggered REGISTER request to the P-CSCF to register with the S-CSCF, facilitating the IMS OTT application receiving the SIP request even when the IMS OTT application is suspended by the operating system.

11. The method of claim 1, wherein the method further comprises a plurality of application servers communicating with a plurality of IMS OTT applications, and wherein the notification triggering the push notification, from each of the plurality of application servers to any of the plurality of IMS OTT applications, originates only from a single functional element, the access gateway.

12. The method of claim 1, wherein the sending occurs upon receipt of an SIP request when a network connection is broken, wherein the SIP request contains information that does not require a response, and wherein the notification further includes the information, and wherein the push notification also awakens the OTT application and delivers the information without sending a registration request.

13. The method of claim 1, wherein the access gateway is configured to perform a lightweight authentication of notification-triggered REGISTER requests by:
1) generating, in the access gateway, a token and a nonce, locally storing the token and the nonce, and passing the token and the nonce to the OTT application via the notification;
2) receiving, from the OTT application, a REGISTER request including a Digest response that was determined in the OTT application based on the token, as a Digest password, and the nonce;
4) using the locally stored token and the nonce to compute the access gateway's own Digest response;
5) comparing the access gateway's own Digest response with the Digest response received in the REGISTER request to determine if the lightweight authentication is a success; and
6) sending, from the P-CSCF to a S-CSCF, in the event of a successful lightweight authentication, a third party REGISTER request that includes an "auth-done" indication limiting authentication to the P-CSCF and not the S-CSCF.

14. A method for facilitating communications between an over-the-top (OTT) application on a user device, wherein the OTT application has been suspended by an operating system, the method comprising:
receiving, at the suspended OTT application, a push notification, from a push notification framework, that was triggered by a notification from an access gateway, the push notification including a token, wherein the access gateway comprises one of a Proxy-Call Session Control Function (P-CSCF) or a Real Time Communication in Web-browsers (WebRTC) Gateway;
using, by the OTT application, the token as a Digest password, and
sending, from the OTT application to the access gateway, a push notification initiated register request including a Digest response based on the Digest password, to register with an Internet Protocol Multimedia Core Network Subsystem (IMS) core network with a lightweight IMS authentication based on the token.

15. The method of claim 14, wherein the access gateway performs the lightweight IMS authentication and a Serving Call Session Control Function (S-CSCF) does not perform authentication for the push notification initiated REGISTER request.

16. The method of claim 14, wherein the OTT application is an IMS OTT application or a WebRTC OTT application.

17. An access gateway device, wherein the access gateway device is one of a Proxy-Call Session Control Function (P-CSCF) device or a Real Time Communication in Web-browsers (WebRTC) Gateway device, the access gateway device configured to send a notification to a push notification framework, wherein the notification is configured to cause the push notification framework to send a push notification to a suspended over-the-top (OTT) application that causes the suspended OTT application to wake up and to send a push notification initiated REGISTER request to the access gateway device, and wherein the access gateway device is configured to (i) determine, based on one of session initiation protocol (SIP) header information or hypertext transfer protocol (HTTP) header information, whether the suspended OTT application supports the push notification framework, and (ii) send the notification to the push notification framework to cause the sending of the push notification, only if the suspended OTT application supports the push notification framework.

18. The access gateway device of claim 17, configured to receive the session initiation protocol (SIP) request, to queue the SIP request, and to embed information from the SIP request in the notification.

* * * * *